Feb. 2, 1960   R. A. STRONG   2,923,494
GROUND-AIR VEHICLE
Filed March 26, 1958   3 Sheets-Sheet 1

INVENTOR.
RICHARD A. STRONG
BY
Gustave Miller
ATTORNEY

United States Patent Office 2,923,494
Patented Feb. 2, 1960

2,923,494

GROUND-AIR VEHICLE

Richard A. Strong, Harlingen, Tex.

Application March 26, 1958, Serial No. 724,105

7 Claims. (Cl. 244—2)

This invention relates to a vehicle which is adapted for both ground travel and air travel, and it particularly relates to a device of the above type which utilizes the same power plant for both types of travel.

Although there have been other types of ground-air vehicles heretofore proposed and even built, such vehicles have never been commercially feasible because of their ungainliness and because of their complex power system which usually required two separate engines, one for ground and one for air travel. This meant that overly complicated change gear mechanism as well as various duplicate elements were necessary.

It is one object of the present invention to provide a ground-air vehicle which is generally simple in construction and which utilizes the same power plant for both types of travel.

Another object of the present invention is to provide a ground-air vehicle which is trim and compact for ground travel taking no greater room than many automobiles, while yet having sufficient lift surface for efficient air travel.

Another object of the present invention is to provide a ground-air vehicle which is both effective and safe either on the ground or in the air.

Other objects of the present invention are to provide an improved ground-air vehicle, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
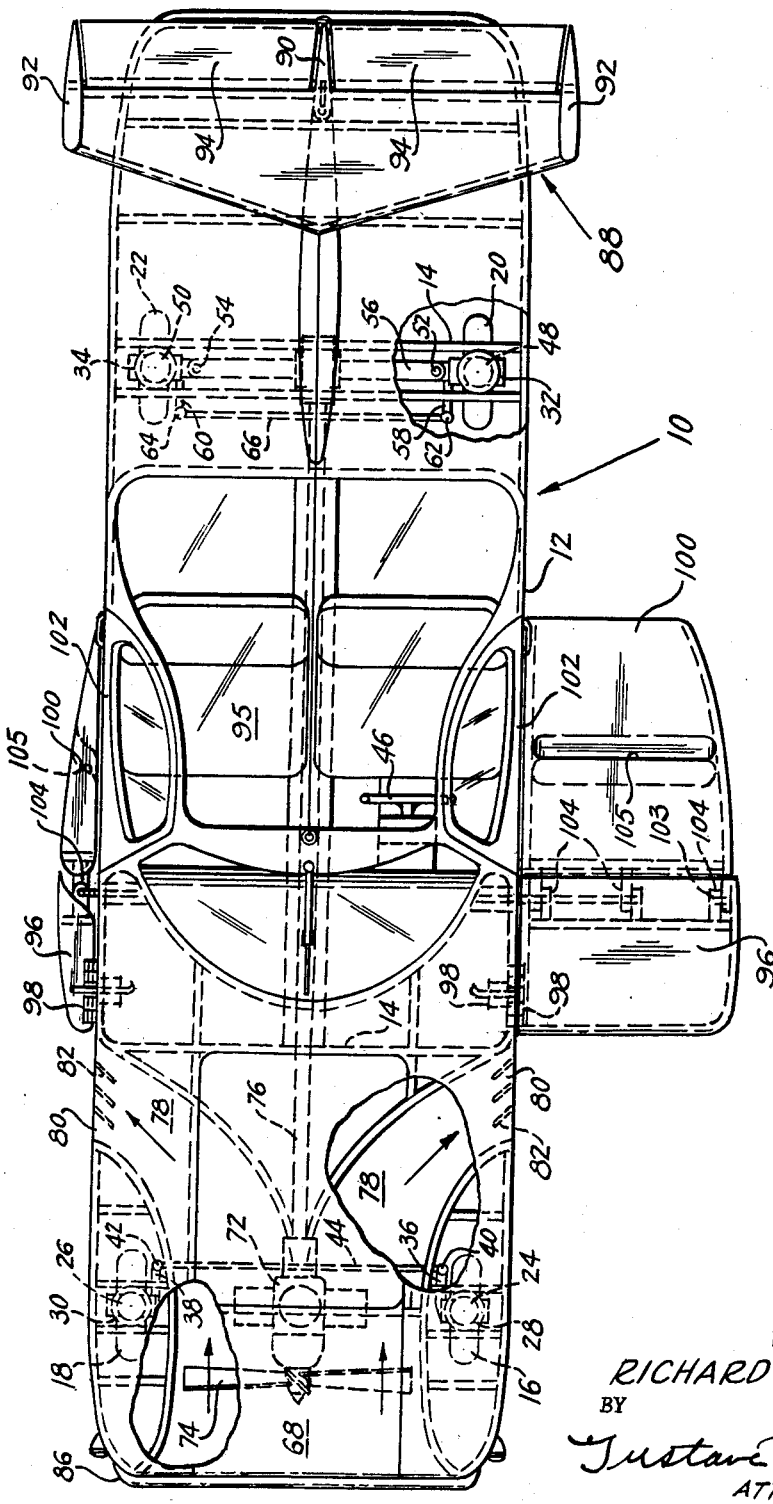
Fig. 1 is a top plan view of a device embodying the present invention.

Referring now in greater detail to the drawings wherein similar reference characters refer to similar parts, there is shown a vehicle, generally designated 10, comprising a body 12, of generally streamlined shape, which encloses a chassis 14. Mounted on the chassis 14 are two front wheels 16 and 18 and two rear wheels 20 and 22. Each wheel is mounted for rotation on an axle, such as, for example, shown at 24 and 26 in Fig. 2; each of these axles being, in turn, connected to the lower yoke end of a tubular vertical shaft, indicated respectively at 28, 30, 32 and 34. The front shafts 28 and 30 are connected at their upper ends to corresponding levers 36 and 38 which are, in turn, pivotally connected, as at 40 and 42, to corresponding ends of a cross-link 44. The cross-link 44 is connected to a driving wheel 46 by a standard assembly, not shown.

At the rear of the device, the tubular shafts 32 and 34 telescopically and rotatably encompass respective supporting rods 48 and 50 connected to the chassis 14. The tubular shafts 32 and 34 are each pivoted, as at 52 and 54, to a corresponding end of a cross-link 56. These shafts 32 and 34 are also each connected to a lever, as at 58 and 60, these levers being pivoted, as at 62 and 64, to a cross-link 66. The link 66 is also connected by standard means, not shown, to the steering wheel 46.

By the above-described arrangement, when the steering wheel 46 is turned in one direction or the other, both the front wheels 16 and 18 and the rear wheels 20 and 22 are simultaneously turned so that a four-way steering is provided. This permits a smaller radius of turn for each wheel 16, 18, 20 and 22 so that the body 12 can extend uniformly down to enclose the wheels whereby there is less air drag. It also permits easier parking, better control and fewer different parts.

At the front end of the body 12 is provided an engine housing 68 which has a wide round opening 70 at its front. Within the housing 68 is an engine 72 of the standard type used in ordinary light airplanes. The engine 72 is provided with a propeller 74 which is positioned within the housing 68. The propeller is reversible so that the vehicle can be moved both forwardly and rearwardly by the engine while the vehicle is on the ground. The engine is provided with clutch means, not shown, for connecting it to a drive shaft 76 which is, itself, drivingly connected to the rear wheel assembly. By using the clutch to connect the engine to the drive shaft 76, good traction is obtained when using the vehicle for ground travel. However, the clutch can also be kept disengaged while using the vehicle for ground travel. In such case, the propeller 74 provides an air drive for the vehicle. If desired, the drive shaft and clutch may be entirely eliminated whereby both the weight of the vehicle and its cost are substantially decreased.

A pair of oppositely-curved ducts 78 extend from the interior of the engine housing 68 to ports 80 on the opposite sides of the body 12. Each port 80 is provided with a series of vertical turning vanes 82 which serve to increase the speed of the combustion gases from the engine housing 68 and direct them toward the rear to increase the thrust.

The enclosing of the engine 72 and propeller 74 within the engine housing 68 makes the engine quieter and safer for ground use since there is no danger of personal injury due to unexposed propeller blades.

In order to increase the lift and make it aerodynamically more efficient, the bottom of the body 12 is covered so that it forms a slab-type fuselage with the wide, flat bottom providing a large amount of planing lift.

At the front of the fuselage formed by the body 12 there are provided ordinary headlights 84 and streamlined, tubular bumpers 86, while at the rear is provided a tail assembly 88 including a rudder 90, oppositely-disposed vertical stabilizers 92 and flaps 94. The various parts of the tail assembly are operated from standard aircraft-control means, not shown, positioned in the cabin 95.

Figure 3:
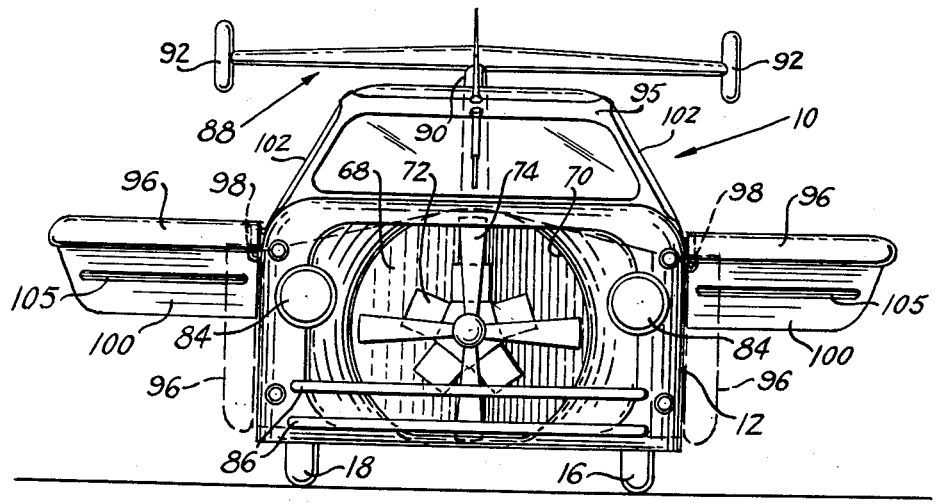
Fig. 3 is a front elevational view of the device of Fig. 1.
Figure 4:
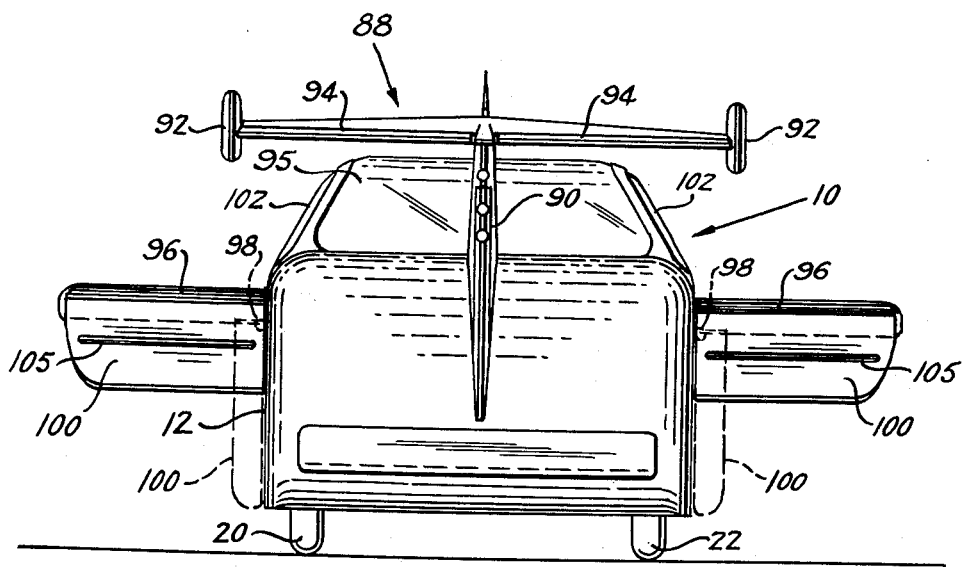
Fig. 4 is a rear elevational view of the device of Fig. 1.

A pair of short, stub wings 96 are pivotally connected to the body 12, as at 98, in such manner that they can be folded down into collapsed position, as indicated in dotted outline in Fig. 3. Each of the ailerons 100 is hinged to the corresponding wing 96 along a hinge line corresponding to the line of the corresponding door 102 by means of a series of hinge means 104. Each hinge means 104 comprises a pair of ears, one extending from the wing and one from the aileron; these ears being hingedly connected by a hinge pin 103 positioned in a parallel plane to the plane of the door hinge. In this manner, when the wings and ailerons are in folded position, the axis of the hinge pins 103 are parallel to the axis of the door hinge and both the door and aileron will swing out together upon opening the door.

Figure 2:
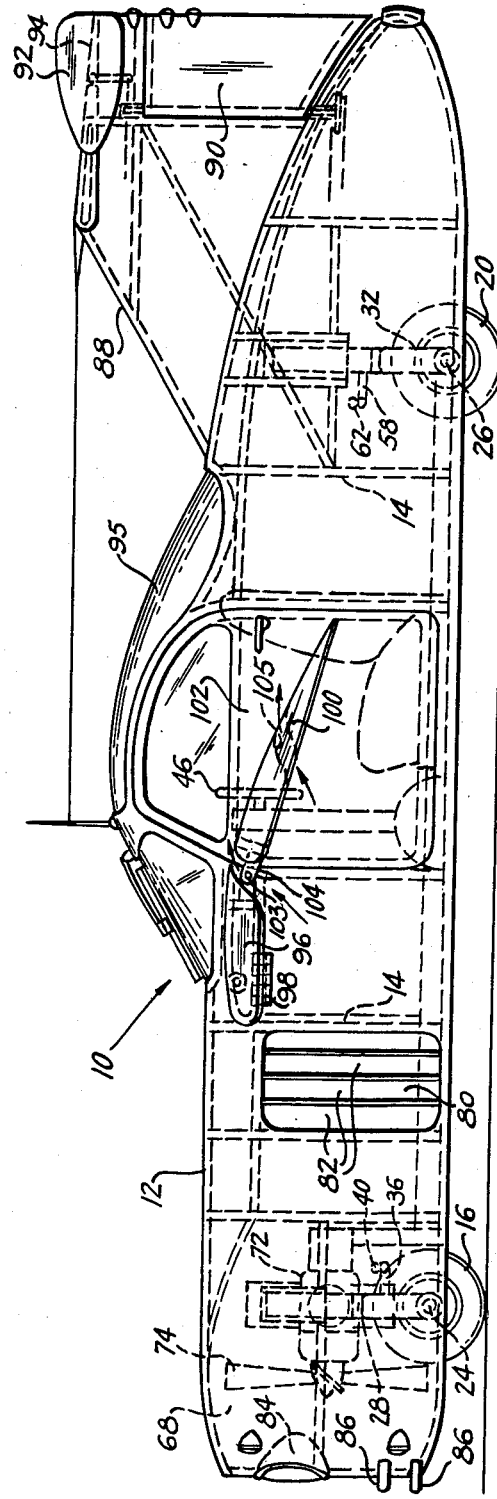
Fig. 2 is a side elevational view of the device of Fig. 1.

Inclined slots 105 are provided in the ailerons 100 so that when the wings and ailerons are in extended position (as in Fig. 2) these slots 105 co-act with the slots formed between the wings and ailerons at their hinge connections to provide additional lift due to the movement of the air streams therethrough (as indicated by the arrows in Fig. 2).

Since the planing effect of the covered fuselage bottom is relatively great, the wings 96 may be very short. Because they are so short, it is possible to make them rigid instead of collapsible, thereby decreasing the cost of the device and make it simpler. However the collapsible type, as illustrated, is usually preferred because it creates no obstructions at all on either side of the body 12 so that there is more room in traffic on the ground.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed:

1. A ground-air vehicle comprising a chassis, a body enclosing said chassis, said body having a cabin and including a closed streamlined undercover, a pair of front wheels and a pair of rear wheels having their major portions within said undercover, a steering mechanism operatively connected to each pair of wheels, an engine housing at the front end of said body, a front opening in said engine housing, an engine and vehicle propelling propeller assembly entirely enclosed within said engine housing, a pair of oppositely-extending streamlined exhaust ducts leading from said engine housing to ports on the sides of said body, and an airfoil system mounted on said body.

2. The vehicle of claim 1 wherein said airfoil system includes oppositely extending short wings and ailerons, said ailerons being hinged to said wings in spaced relation thereto.

3. The vehicle of claim 2 wherein said wings and ailerons are foldable downwardly flat against the sides of said body.

4. The vehicle of claim 1 wherein said ports are provided with vertical parallel vanes spaced from each other and diagonally arranged to direct the flow of exhaust gases outwardly and rearwardly of said vehicle.

5. A ground-air vehicle comprising a fuselage-like body including a cabin and having an open front end, a streamlined closed bottom and an aerodynamic tail assembly at its rear end, a pair of front wheels and a pair of rear wheels having their major portions within said body and their minor portions extending therebelow, a steering wheel assembly operatively connected to both said front and rear wheels, said open front end defining the front of an engine housing, an engine and vehicle propelling propeller assembly within said engine housing, means to releasably connect said engine to said rear wheels, a pair of streamlined exhaust ducts connecting said engine housing to exhaust ports in opposite sides of said body, means to direct exhaust gases rearwardly from said exhaust ports, and a foldable wing and aileron assembly pivotally secured on each side of said body.

6. The vehicle of claim 5 wherein said wing and aileron assembly comprises a short stub wing pivotally secured on each side of said body and an aileron hingedly connected to each wing in spaced relation thereto.

7. The vehicle of claim 5 wherein said exhaust ports are positioned on each side of said body and wherein said means to direct exhaust gases rearwardly comprise vertical vanes spaced from each other and each diagonally positioned at an angle extending outwardly and rearwardly.

References Cited in the file of this patent

UNITED STATES PATENTS

| | | |
|---|---|---|
| 1,310,898 | Snell | July 22, 1919 |
| 1,866,393 | Brooks | July 5, 1932 |
| 2,523,938 | Berliner | Sept. 26, 1950 |
| 2,609,167 | Gero | Sept. 2, 1952 |